(12) United States Patent
Johnston et al.

(10) Patent No.: US 9,086,159 B2
(45) Date of Patent: Jul. 21, 2015

(54) VALVE ASSEMBLY

(75) Inventors: Thomas Andrew Johnston, Richmond, VA (US); Joseph Chapman, Chesterfield, VA (US); Ian Cowen, Richmond, VA (US)

(73) Assignee: ALSTOM TECHNOLOGY LTD., Baden (CH)

( * ) Notice: Subject to any disclaimer, the term of this patent is extended or adjusted under 35 U.S.C. 154(b) by 273 days.

(21) Appl. No.: 13/035,014

(22) Filed: Feb. 25, 2011

(65) Prior Publication Data
US 2012/0217428 A1 Aug. 30, 2012

(51) Int. Cl.
F16K 15/06 (2006.01)
F16K 17/04 (2006.01)

(52) U.S. Cl.
CPC .............. *F16K 15/063* (2013.01); *F16K 17/044* (2013.01); *Y10T 29/49716* (2015.01)

(58) Field of Classification Search
CPC ................ F16K 15/063; F16K 17/044; Y10T 29/49716
USPC ............ 137/496, 516.13, 538, 540, 542, 543, 137/543.13, 508, 512.1–513, 625.28, 137/599.18, 601.2, 474
See application file for complete search history.

(56) References Cited

U.S. PATENT DOCUMENTS

| | | | |
|---|---|---|---|
| 963,385 A | 7/1910 | Oleson | |
| 2,614,580 A * | 10/1952 | Cormier | 137/474 |
| 4,259,983 A | 4/1981 | Kessel | |
| 4,274,435 A * | 6/1981 | Block | 137/508 |
| 4,282,896 A * | 8/1981 | Makino | 137/495 |
| 4,669,500 A | 6/1987 | Strelow | |
| 4,682,625 A * | 7/1987 | Christopher | 137/538 |
| 4,877,052 A | 10/1989 | Toshio et al. | |
| 4,887,872 A * | 12/1989 | Adams et al. | 305/147 |
| 4,893,654 A | 1/1990 | Feuz | |
| 4,901,987 A | 2/1990 | Greenhill et al. | |
| 5,046,525 A | 9/1991 | Powell | |
| 5,168,895 A * | 12/1992 | Voss | 137/494 |
| 5,782,269 A * | 7/1998 | Seaney et al. | 137/630.22 |
| 6,152,170 A * | 11/2000 | Nouveau et al. | 137/512 |
| 6,209,527 B1 * | 4/2001 | Bueser et al. | 123/514 |
| 7,025,085 B2 | 4/2006 | Price et al. | |
| 2005/0103386 A1 | 5/2005 | Magda | |
| 2008/0087331 A1 | 4/2008 | Kaitsuka | |

OTHER PUBLICATIONS

Bucher Hydraulics, Check Valves, Size 04 . . . 25 Plate-Type, Screw-in Design Series Rve . . . 140 l/min, 350 bar (500 bar), May 2009, Classification: 4.30.30.40.10; Reference: 170-P-050000-E-03.

* cited by examiner

Primary Examiner — William McCalister
(74) Attorney, Agent, or Firm — Buchanan Ingersoll & Rooney PC

(57) ABSTRACT

A valve assembly includes a valve seat having a valve opening therein. A valve plate is configured to sealingly engage the valve seat in a closed position for closing the valve opening to thereby close a fluid path through the valve assembly, the valve plate being biased toward the closed position by a first spring. An actuator plate can include an inlet opening therein, the actuator plate being biased in a direction away from the valve plate by a second spring. A member includes a first end fixed to the actuator plate, an interior passage in communication with the inlet opening in the actuator plate, and a second end engageable with the valve plate when a portion of the member passes through the valve opening of the valve seat, wherein the valve plate is configured to open in response to direct fluid pressure when fluid is guided to the valve plate by the member or when fluid pressure on the actuator plate is transmitted to the valve plate via the member.

13 Claims, 3 Drawing Sheets

VALVE ASSEMBLY

BACKGROUND

Nonreturn valves, or check valves, are used in a variety of applications for establishing unidirectional flow. For example, the fuel delivery system of a gas turbine can have a nonreturn valve which ensures that fuel exits the fuel supply system when the fuel has been pressurized to a threshold level. The nonreturn valve opens when the fuel pressure has reached the threshold level and closes when the fuel pressure drops below the threshold level.

Gas turbines can be operated at a high temperature level, and the heated fuel can cause coking throughout the turbine, including the fuel delivery system. Coking results when fuel stagnates in certain locations of the fuel delivery system, such as in corners. The stagnated fuel can solidify in place as it continues to be heated.

Coking and other deposits can cause the nonreturn valve to seize closed or open. Known methods for releasing seized nonreturn valves in gas turbines involve breaking the flow path at the point where the seizure has occurred and manually resetting the valve to an operational condition. However, in a device which may have several operational cycles before coming offline, manually resetting valves can be impractical.

SUMMARY

A valve assembly is disclosed which includes a valve seat having a valve opening therein; a valve plate configured to sealingly engage the valve seat in a closed position for closing the valve opening to thereby close a fluid path through the valve assembly, the valve plate being biased toward the closed position by a first spring; an actuator plate having an inlet opening therein, the actuator plate being biased in a direction away from the valve plate by a second spring; and a member having a first end fixed to the actuator plate, an interior passage in communication with the inlet opening in the actuator plate, and a second end engageable with the valve plate when a portion of the member passes through the valve opening of the valve seat, wherein the valve plate is configured to open in response to direct fluid pressure when fluid is guided to the valve plate by the member or when fluid pressure on the actuator plate is transmitted to the valve plate via the member.

Also disclosed is a method of retrofitting an actuator assembly to a check valve, the check valve having a valve seat with a valve opening therein and a valve plate configured to sealingly engage the valve seat in a closed position for closing the valve opening to thereby close a fluid path through the check valve, the valve plate being biased toward the closed position by a first spring, the method comprising positioning an actuator assembly relative to the check valve, the actuator assembly having an actuator plate and a member, the actuator plate having an inlet opening therein and being biased by a second spring, the member having a first end fixed to the actuator plate, an interior passage in communication with the inlet opening in the actuator plate, and a second end, wherein the actuator is positioned such that a portion of the member passes through the valve opening of the valve seat and the second end of the member is engaged with the valve plate, whereby the valve plate can open in response to direct fluid pressure when fluid is guided to the valve plate by the member or when fluid pressure on the actuator plate is transmitted to the valve plate via the member; and fixing the actuator assembly in the position relative to the check valve.

BRIEF DESCRIPTION OF THE DRAWING FIGURES

Other objects and advantages will be apparent to those skilled in the art from reading the following detailed description of exemplary embodiments in conduction with the drawings, wherein like elements are represented by like reference numerals, and wherein.

Figure 1:
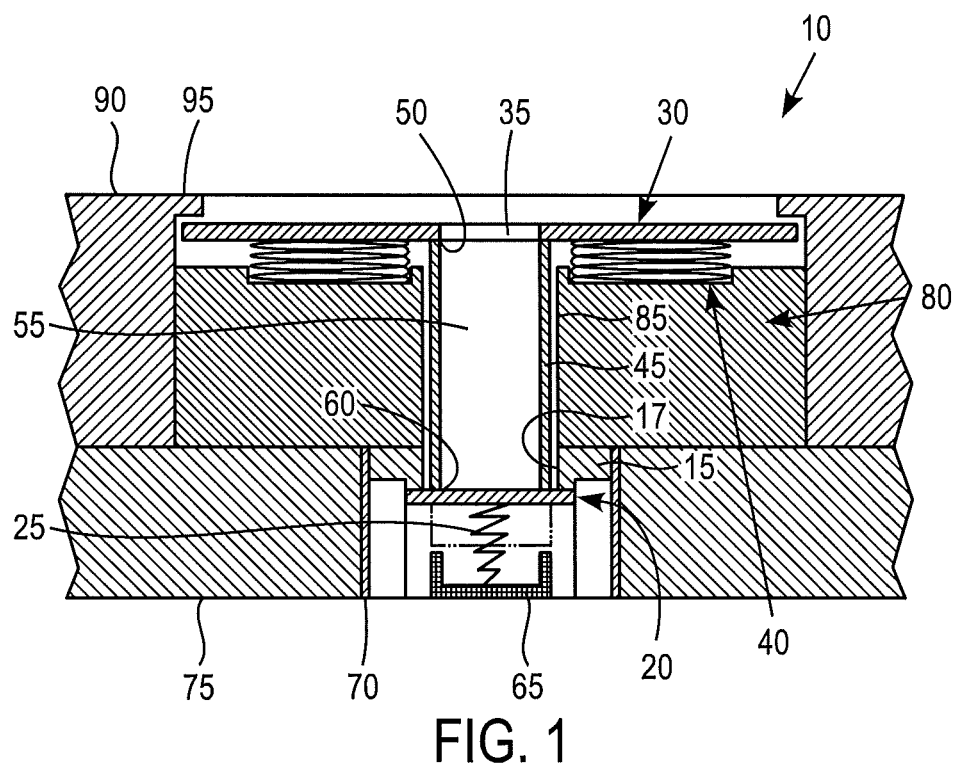
FIG. 1 illustrates a cross-sectional view of a valve assembly according to a first exemplary embodiment.
Figure 3A:
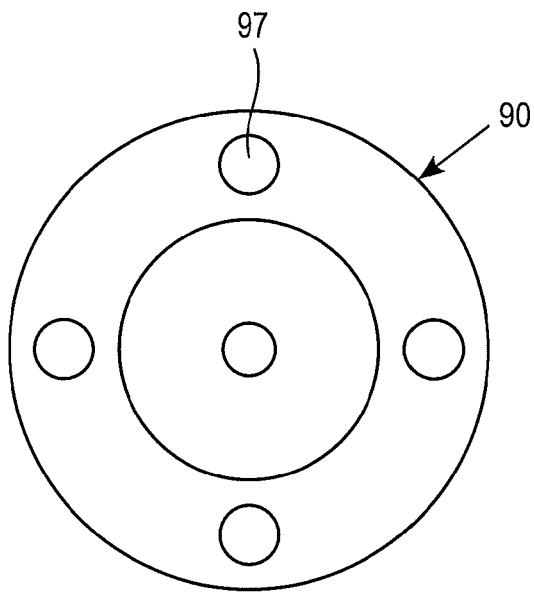
Figure 3B:
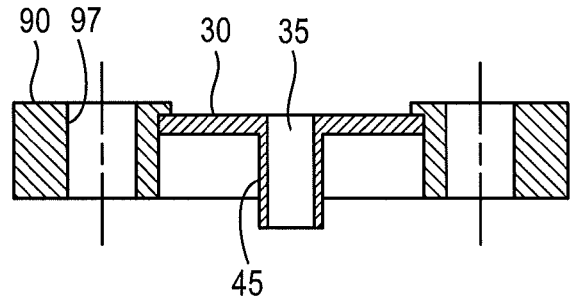
Figure 4A:
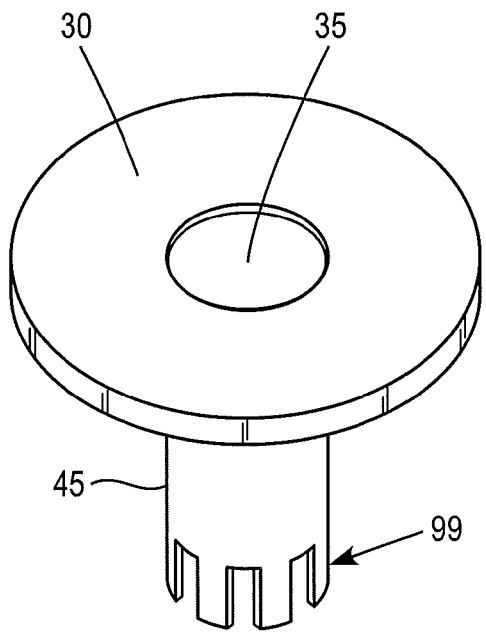
Figure 4B:
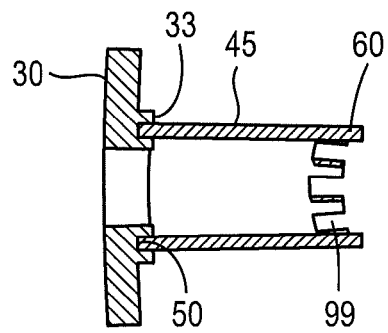
Figure 5:
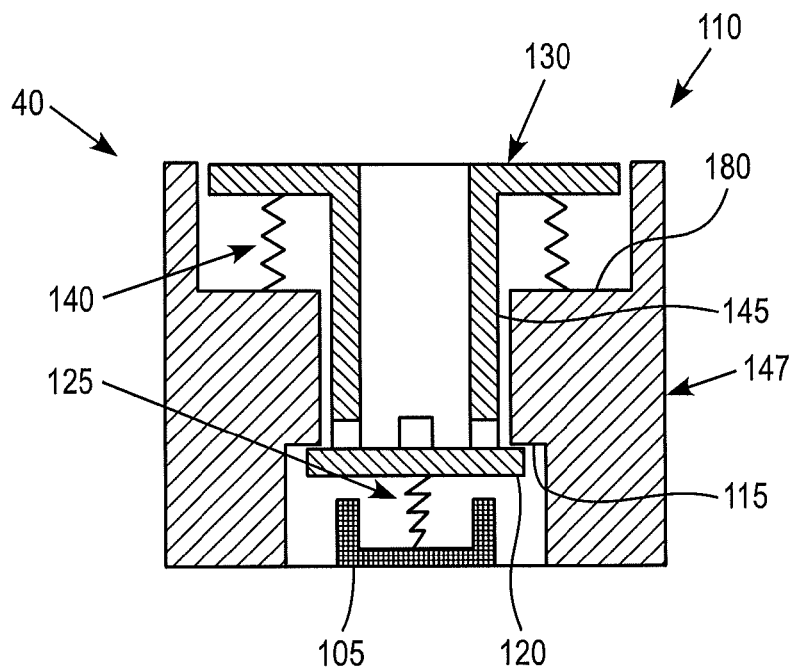
Figure 6:
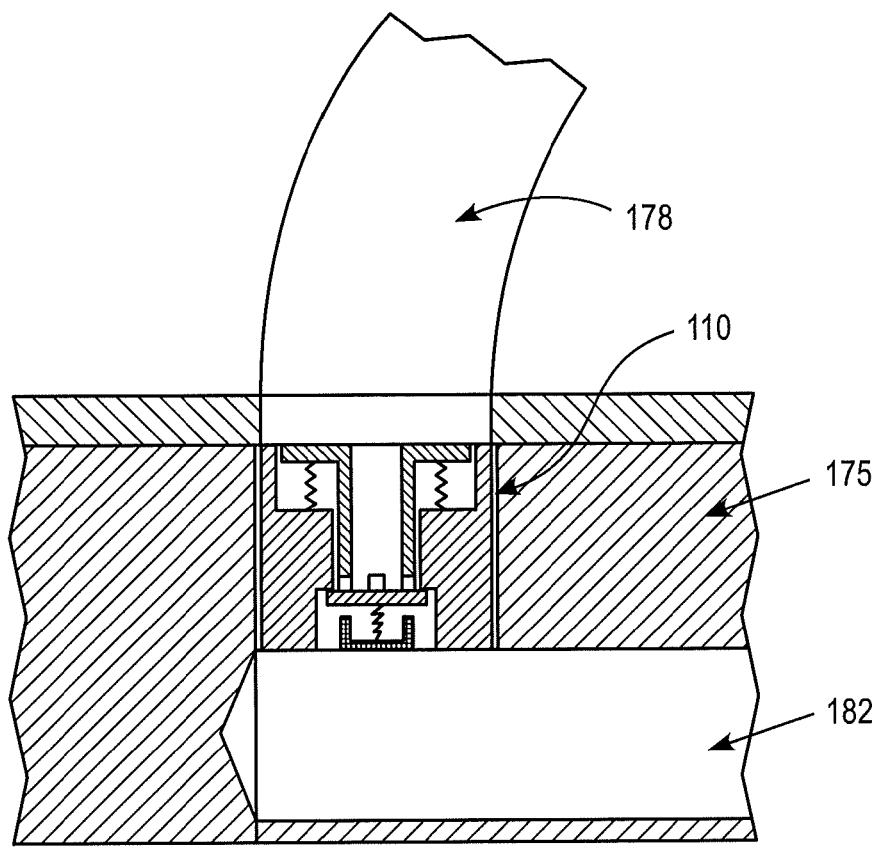

FIGS. 3(a) and 3(b) illustrate an end view and a cross-sectional view, respectively, of a passive actuator assembly of the valve assembly according to the FIG. 1 embodiment;

FIGS. 4(a) and 4(b) illustrate a perspective view and a cross-sectional view, respectively, of an actuator plate and member of the valve assembly according to the FIG. 1 embodiment;

FIG. 5 illustrates a cross-sectional view of a valve assembly according to a second exemplary embodiment; and FIG. 6 illustrates a cross-sectional view of the valve assembly according to the FIG. 5 embodiment installed in a fuel delivery system of a gas turbine.

DETAILED DESCRIPTION OF EXEMPLARY EMBODIMENTS

FIG. 1 shows a first exemplary embodiment of a valve assembly 10 which includes a valve seat 15 having a valve opening 17 therein. A valve plate 20 is configured to sealingly engage the valve seat 15 in a closed position for closing the valve opening 17 to thereby close a fluid path through the valve assembly 10, the valve plate 20 being biased toward the closed position by a first spring 25. An actuator plate 30 includes an inlet opening 35 therein, the actuator plate 30 being biased in a direction away from the valve plate 20 by a second spring 40, and a member 45.

In the FIG. 1 example, the member 45 has a first end 50 fixed to the actuator plate 30, an interior passage 55 in communication with the inlet opening 35 in the actuator plate 30, and a second end 60 engageable with the valve plate 20 when a portion of the member 45 passes through the valve opening 17 of the valve seat 15.

Figure 2:
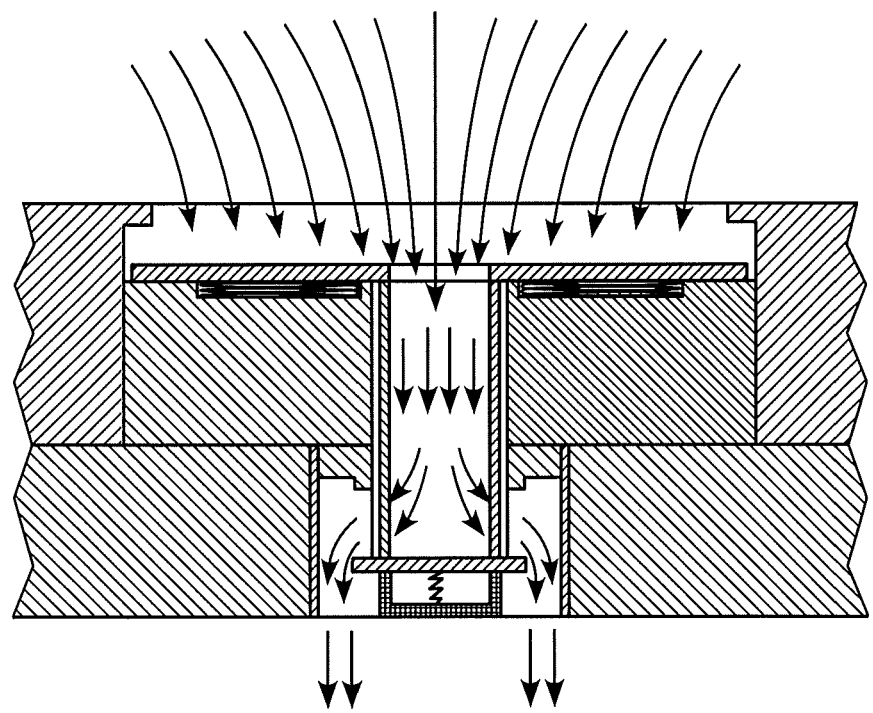
FIG. 2 illustrates a cross-sectional view of the valve assembly according to the FIG. 1 embodiment in an actuated state.

Referring to FIG. 2, the valve plate 20 is configured to open in response to direct fluid pressure when fluid is guided to the valve plate 20 by the member 45 or when fluid pressure on the actuator plate 30 is transmitted to the valve plate 20 via the member 45.

The first spring 25 can be supported by a first spring retainer 65. The valve seat 15 and first spring retainer 65 can be fixed within a valve case 70, and configured so that movement of the valve plate 20 is constrained between the valve plate 15 and the first spring retainer 65. The first spring retainer 65 can be fixed to the valve case 70 by, for example, radially extending struts having a first end fixed to the outer wall of the first spring retainer 65 and a second end the inner wall of the valve case 70. In this configuration, the valve seat 15, valve plate 20, first spring 25, first spring retainer 65 and valve case 70 form a check valve. This check valve can be mounted in an opening in a wall 75.

The second spring 40 can be supported by a second spring retainer 80 having an interior passage 85 for accommodating the member 45. The second spring retainer 80 can be fixed within an actuator case 90 having an inward rib 95 configured so that movement of the actuator plate 30 is constrained between the inward rib 95 and the second spring retainer 80.

In this configuration, the actuator plate 30, second spring 40, first spring retainer 65 and valve case 70 form an actuator assembly. This actuator assembly can be mounted on the surface of a wall, such as the portion of the wall 75 containing a check valve. The actuator case 90 can be provided with holes 97 as illustrated, for example, in FIGS. 3(a) and 3(b), for accommodating connectors, such as bolts or screws, for connecting the actuator case 90 to the wall 75.

As best seen in FIGS. 3 and 4, the actuator plate 30 and member 45 can be formed as separate pieces fixed together. For example, the member 45 can be interference fit into a groove 33 formed in the actuator plate 30. Alternatively, or in addition, other techniques, such as welding, can be used to fix the actuator plate 30 and the member 45 together. Another alternative involves monolithically forming the actuator plate 30 and member 45 as a single piece.

At or near the second end 60 of the member 45, which can be tubular, lateral openings 99 can be provided. These openings 99 permit fluid to flow therethrough even when the second end 60 is engaged with the valve plate 20.

In the exemplary valve assembly 10 of FIG. 1, the actuator plate 30 presents a greater surface area to the fluid flow than the valve plate 20, and thus, the same fluid pressure can provide a greater force on the actuator plate 30 than on the valve plate 20. The spring constants and spring preloads of the first and second springs 25 and 40 can be selected so that relative forces caused by the expected levels of fluid pressure on the plates 20 and 30 are significantly larger than the spring return forces, even when the springs are under maximum compression. This configuration can provide for a redundant actuator in the event the valve seizes closed. For example, if the valve plate 20 becomes stuck to the valve seat 15, such as by coking buildup, fluid pressure on the actuator plate 30 will be transmitted to the valve plate 20 via the member 45, which can assist in releasing the stuck valve plate 20.

The exemplary valve assembly 10 can be produced by, for example, retrofitting the actuator assembly to an existing check valve in situ. The actuator assembly can be retrofitted to the check valve by positioning the actuator assembly relative to the check valve such that a portion of the member 45 passes through the valve opening 17 of the valve seat 15 and the second end 60 of the member 45 is engaged with the valve plate 20, and fixing the actuator assembly in the position relative to the check valve.

With an in situ retrofit, it may be difficult to fix the member 45 to the valve plate 20. In such a case, the member 45 need not be fixed to the valve plate 20. Rather, the member 45 can be configured to move independently of the valve plate 20.

A valve assembly 110 according to a second exemplary embodiment illustrated in FIG. 5 can be installed as original equipment in its entirety. The FIG. 5 valve assembly 110 includes a valve plate 120, first spring 125, actuator plate 130, second spring 140 and member 145 which are similar to the first embodiment. Because the valve assembly 110 is configured to be original equipment rather than a retrofit, it is feasible for the valve plate 120 and the member 145 to be fixed together, for example, by welding.

Rather than having separate cases, a unitary assembly case 147, which includes a valve seat 115, a first spring retainer 165, a second spring retainer 180, and bores of various sizes for accommodating the valve plate 120, actuator plate 130, and member 145 can be provided. In this regard, at least the valve seat 115 and the second spring retainer 180 can be monolithically formed as a single piece. The unitary structure and the uniform outside diameter allows the entire valve assembly 110 to be installed in a bore of a wall 175 as illustrated in FIG. 6. Otherwise, the detailed structure of the assembly case 147 is substantially the same as that of the FIG. 1 valve seat 15, first spring retainer 65, valve case 70, second spring retainer 80, and actuator case 90 of the valve assembly 10 according to the first exemplary embodiment.

Because the FIG. 5 member 145 is fixed to the valve plate 120 in this exemplary embodiment, the case where the valve is seized open can also be addressed. For example, because the first and second springs 125 and 140 both bias the valve closed, a greater force can be applied to the valve plate 120 in a direction closing the valve. The valve plate 120 is therefore less likely to become seized open.

FIG. 6 illustrates the second exemplary valve assembly 110 in an installed condition in a fuel delivery system of a gas turbine. The valve assembly 110 is installed in a bore of a wall 175 which is located between the incoming fluid line 178 and the outgoing fluid passage 182.

It will be appreciated by those skilled in the art that the present invention can be embodied in other specific forms without departing from the spirit or essential characteristics thereof. The presently disclosed exemplary embodiments are therefore considered in all respects to be illustrative and not restricted.

What is claimed is:

1. A valve assembly, comprising:
a valve seat having a valve opening therein;
a valve plate configured to sealingly engage the valve seat in a closed position for closing the valve opening by directly contacting a contact portion of the valve seat to thereby close a fluid path through the valve assembly, the valve plate being biased toward the closed position by a first spring;
an actuator plate having an inlet opening therein, said actuator plate being biased in a direction away from the valve plate by a second spring; and
a member having a first end fixed to the actuator plate, an interior passage in communication with the inlet opening in the actuator plate, and a second end engageable with the valve plate when a portion of the member passes through the valve opening of the valve seat to thereby extend beyond the contact portion of the valve seat, wherein the valve plate is configured to open solely in response to direct fluid pressure on the valve plate when fluid is guided to the valve plate by the member and is configured to open when fluid pressure on the actuator plate is transmitted to the valve plate via the member, and wherein the second end of the member has an opening which is in communication with the interior passage and which directly faces the valve plate.

2. A valve assembly according to claim 1, wherein the first spring is supported by a first spring retainer.

3. A valve assembly according to claim 2, wherein the valve seat and the first spring retainer are fixed within a valve case.

4. A valve assembly according to claim 2, wherein the valve seat and the first spring retainer are configured to constrain movement of the valve plate between the valve seat and the first spring retainer.

5. A valve assembly according to claim 1, wherein the second spring is supported by a second spring retainer.

6. A valve assembly according to claim 5, wherein the second spring retainer includes an interior passage accommodating the member.

7. A valve assembly according to claim 5, wherein the second spring retainer is fixed within an actuator case.

8. A valve assembly according to claim 7, wherein the actuator case includes an inward rib, the inward rib and the second spring retainer being configured to constrain movement of the actuator plate between the inward rib and the second spring retainer.

9. A valve assembly according to claim 5, wherein the valve seat and the second spring retainer are monolithically formed as a single piece.

10. A valve assembly according to claim 1, wherein the actuator plate and the member comprise: separate pieces fixed together.

11. A valve assembly according to claim 1, wherein the actuator plate and the member are monolithically formed as a single piece.

12. A valve assembly according to claim 1, wherein the member is configured to move independently of the valve plate.

13. A valve assembly according to claim 1, wherein the member is fixed to the valve plate.

* * * * *